United States Patent
deCarmo et al.

(10) Patent No.: US 6,708,334 B1
(45) Date of Patent: Mar. 16, 2004

(54) DVD NAVIGATION SYSTEM WITH MULTIPLE THREADS

(75) Inventors: Linden A. deCarmo, Plantation, FL (US); Amir M. Mobini, Delray Beach, FL (US)

(73) Assignee: Oak Technology, Inc., Sunnyvale, CA (US)

( * ) Notice: Subject to any disclaimer, the term of this patent is extended or adjusted under 35 U.S.C. 154(b) by 0 days.

(21) Appl. No.: 09/014,480

(22) Filed: Jan. 28, 1998

(51) Int. Cl.[7] ............................................. G06F 9/00
(52) U.S. Cl. .................................................... 718/106
(58) Field of Search .............................. 709/106, 107; 386/45, 95, 125, 126

(56) References Cited

U.S. PATENT DOCUMENTS

| | | | | |
|---|---|---|---|---|
| 5,487,167 A | * | 1/1996 | Dinallo et al. | 707/500.1 |
| 5,929,857 A | * | 7/1999 | Dinallo et al. | 345/840 |
| 6,246,401 B1 | * | 6/2001 | Setogawa et al. | 345/723 |
| 6,272,625 B1 | * | 8/2001 | deCarmo | 712/245 |

FOREIGN PATENT DOCUMENTS

EP           550196     * 7/1993     ............. G06F/9/46

OTHER PUBLICATIONS

Hideki Mimura, "DVD–Video Format", Feb. 23–26, 1997, Compcon '97. Proceedings IEEE, p. 291–294.*

* cited by examiner

Primary Examiner—John Follansbee
Assistant Examiner—Li B. Zhen
(74) Attorney, Agent, or Firm—Kudirka & Jobse, LLP

(57) ABSTRACT

A navigation system for a digital versatile disc system includes multiple synchronized threads, each of which separately performs a single task so that several tasks can be performed concurrently. In one embodiment, a stream parser thread, a navigation thread and a user interface thread are always created when the DVD player begins operation. In addition, a highlight thread may also be created if the DVD data stream contains highlight information. The stream parser thread receives the DVD data stream and extracts navigation commands and DVD content data from the stream. The navigation commands are sent to the navigation thread for processing, but the content data is sent to system decoders for display. The navigation thread operates separately from the stream parser thread and processes the retrieved navigation commands to select portions of the DVD data stream for display. The user interface thread also operates separately from the stream parser thread and the navigation thread and responds to user commands generated by a user input device, such as a mouse or keyboard, for highlighting buttons on the DVD display screen. Although the threads operate separately, they are synchronized by means of an event control mechanism which may be part of the conventional operating system.

28 Claims, 14 Drawing Sheets

DVD NAVIGATION SYSTEM WITH MULTIPLE THREADS

FIELD OF THE INVENTION

This invention relates generally to improvements in digital versatile disc systems and, more particularly, to an improved navigation system for digital versatile disc systems.

BACKGROUND OF THE INVENTION

Digital versatile discs (DVDs) are information storage devices used for storing prerecorded audio information, movies and computer software. The storage and playback mechanism used in DVDs closely resembles the mechanism used in compact discs (CDs) and DVD players and software use the same laser technology as CD players. Briefly, both DVDs and CDs store information as a pattern of pits formed in a metallic substrate. The pit patterns form digital words and can be read by shining a laser beam on the disc surface and detecting the reflected beam. However, the information storage capacity of a typical DVD is much higher than a CD. Presently available DVDs have a variety of capacities which depend on the technology used to manufacture the discs. Single-layer technologies can be either single or double-sided with capacities of 4.7 gigabytes and 9.4 gigabytes, respectively. Dual layer technologies will soon be available which use single or double sided capacities that hold approximately 8.5 gigabytes per side. This high information storage capacity makes DVDs suitable for storing not only audio information, but also video information and large amounts of computer data as well.

DVD players have many CD player features, such as the ability to play selections in any order desired and the ability to read information from any point on the disc. However, DVDs can store information in several formats. For example, DVDs which are used to store video information (hereinafter called DVD-VIDEO discs) may use various known information compression algorithms, such as MPEG-2 for video compression/decompression. A DVD may also include high fidelity sound as well. In addition, a DVD may also store uncompressed linear pulse code modulated data streams which have sample rates between 48–90 kHz and are sampled at 16 or 24 bits. Still other DVD versions (hereinafter called DVD-ROM discs) can store digital data for computer use, and the data may also be compressed on these discs.

Although DVD-ROM and DVD-VIDEO discs share compression algorithms, the data format on DVD-VIDEO discs is significantly different than the data format found on DVD-ROM discs. One important difference is that the data content on DVD-ROM is platform-specific, while DVD-VIDEO discs operate with a platform independent navigation engine for playing interactive movies. This navigation engine requires that the files on the DVD-VIDEO disc be referenced in predetermined directory structure.

In particular, each DVD-VIDEO disc contains a main directory denoted as a VIDEO_TS directory which contains two types of files distinguished with the file extensions .IFO and .VOB. During playback, these files are sorted by a DVD video player to form video "title" sets, which are groupings of all files necessary to play a particular DVD video "title", for example, a movie. Each video title set is composed of one .IFO file and one or more .VOB files.

A file with the .VOB extension contains the actual multimedia data and is called a video object set. The location and format of the multimedia data stored in the video object set is defined by the associated .IFO file. In particular, .IFO files contain navigational data structures and a processor-independent interpreted language which specifies how the data structures are arranged.

The data structures themselves are composed of various objects called "program chain objects", "program objects", and "cell objects". Program chain objects link related program objects (or particular scenes) within a title and their data structures govern the playback of the program objects. For example, a simple title may contain only one program chain. However, complex titles may contain two or more program chains to allow random access to a variety of programs. The multiple program chain title can play programs linearly, randomly or in a "shuffle" mode.

Each program object in a program chain is composed of elements called "cell objects". These objects instruct a DVD player which portion of the multimedia data in one of the .VOB files to decode. In particular, the data structures in a cell object are defined in the .IFO file and the multimedia content is found in one of the .VOB files. Each cell object directs the DVD player to begin playback at a specific location in the .VOB file which is referred to as a video object unit or "VOBU". A VOBU is a container object that includes both navigational data as well as multimedia data.

Navigational input can also be obtained directly from a user by means of navigational buttons which are displayed under playback program control onscreen along with the multimedia data. The playback program controls both the time duration that the button appears on the screen and the manner that the system responds to the selection of a button by a user. For example, user selection of a button may cause the playback program to jump to a new location on the disk and begin playback at the new location.

The specific navigational commands which are recognized by a DVD player are controlled by a device independent language and a set of DVD player parameters which define the current state of the DVD player. These navigational commands can be broken into several categories including the following: Set, SetSystem, GoTo, Link, Jump and Compare.

Set commands permit primitive operations, such as compare or assignment operations, to manipulate the values of selected stored parameters. SetSystem commands are used to set the internal system parameters of the player. GoTo commands are used to skip to a specific instruction number in the instruction stream and Link and Jump commands cause program execution to jump to various locations within a title or menu on the disc. Finally, Compare commands allow value testing on either a system or user parameter.

The aforementioned DVD navigation commands provide an efficient way to move to different locations on the DVD under program control. However, prior art DVD navigation programs allow only one action to be taken at any given time. Consequently, these navigation programs cannot take advantage of features in modern operating systems such as WINDOWS 95®, WINDOWS NT® or UNIX. For example, conventional DVD navigation systems which receive navigation commands during a data read operation from the DVD drive must wait for the data read operation to finish before processing the additional navigational commands. In addition, prior art navigation operations cannot be easily interrupted by user input. For example, a request to change to a different title, which request is received during DVD navigation, will generally be ignored by conventional systems.

Such prior art systems cannot perform simultaneous execution of multiple navigation commands. Instead, the commands must be performed serially. Further, such systems cannot perform content look ahead, in other words, read information associated with an upcoming title while a current title is being processed.

Therefore, there is a need for a DVD navigation system which if versatile and flexible and can take advantage of features in conventional operating systems.

SUMMARY OF THE INVENTION

The foregoing need is satisfied in one embodiment of the present invention in which a DVD navigation system is comprised of multiple synchronized threads. Each of the threads performs a single task so that several tasks can be performed concurrently.

In one embodiment, a stream parser thread, a navigation thread and a user interface thread are always created when the DVD player begins operation. In addition, a highlight thread may also be created if the DVD data stream contains highlight information. The stream parser thread receives the DVD data stream and extracts navigation commands and DVD content data from the stream. The navigation commands are sent to the navigation thread for processing, but the content data is sent to system decoders for video and audio decoding.

The navigation thread operates independently from the stream parser thread and processes the retrieved navigation commands to select portions of the DVD data stream for display. The user interface thread also operates independently from the stream parser thread and the navigation thread and responds to user commands generated by a user input device, such as a mouse or keyboard, for highlighting buttons on the DVD display screen.

Although the stream parser thread and the navigation thread operate independently, they are synchronized by means of an event control mechanism which may be part of the conventional operating system. Each thread controls an event semaphore and blocks on the semaphore controlled by the other thread.

The threads also share data structures which are protected by locks. Information can be passed between threads by means of objects which are created during thread operation.

BRIEF DESCRIPTION OF THE DRAWINGS

The above and other features, objects and advantages of the invention will be better understood by referring to the following detailed description in conjunction with the accompanying drawing in which.

DETAILED DESCRIPTION OF THE PREFERRED EMBODIMENT

Figure 1:
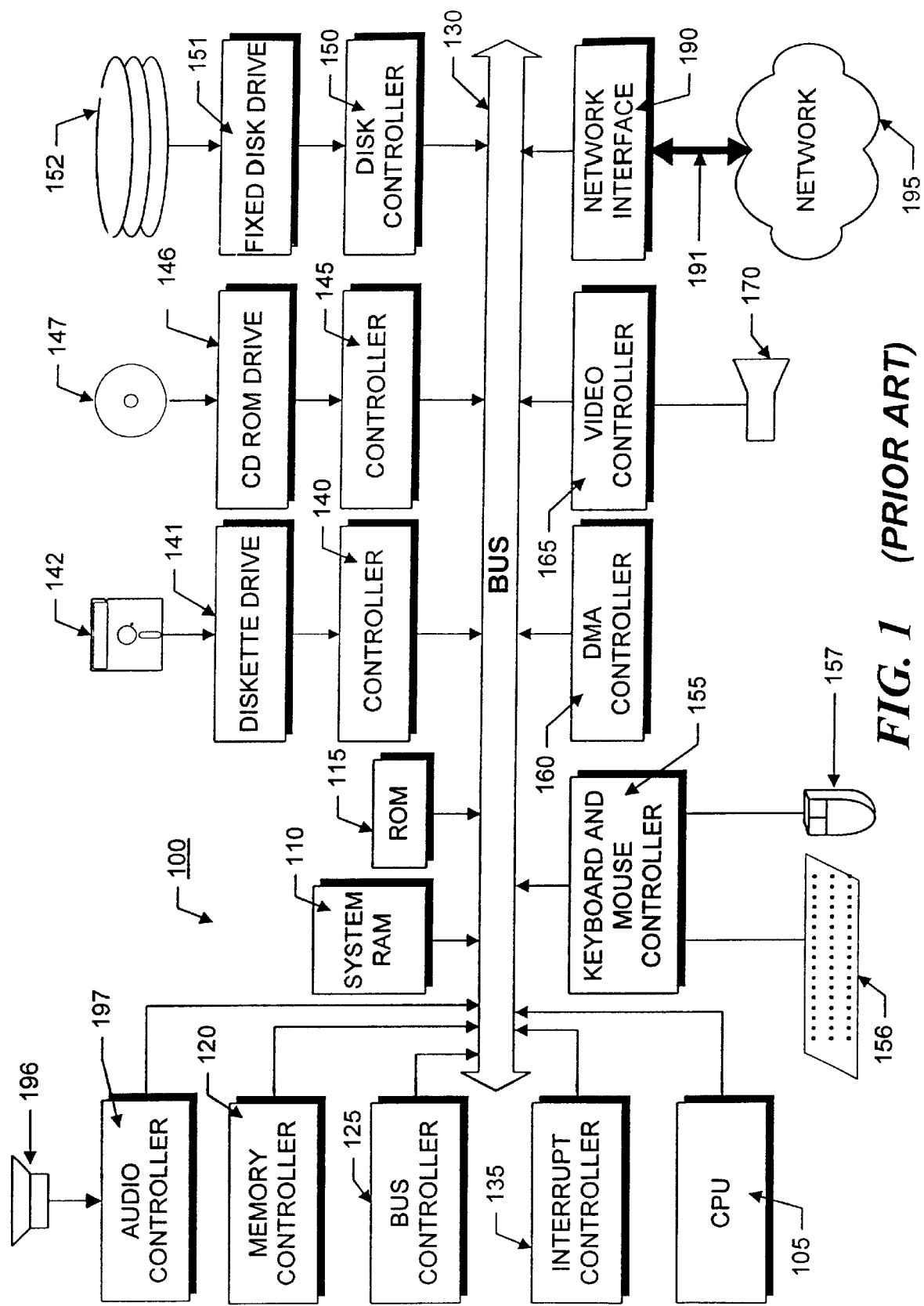
FIG. 1 is a block diagram of a computer system suitable for use with the present invention.

FIG. 1 illustrates the system architecture for a computer system 100 such as an IBM PS/2®, on which the invention may be implemented. The exemplary computer system of FIG. 1 is for descriptive purposes only. Although the description may refer to terms commonly used in describing particular computer systems, such as in IBM PS/2 computer, the description and concepts equally apply to other systems, including systems having architectures dissimilar to FIG. 1.

Computer system 100 includes a central processing unit (CPU) 105, which may be implemented with a conventional microprocessor, a random access memory (RAM) 110 for temporary storage of information, and a read only memory (ROM) 115 for permanent storage of information. A memory controller 120 is provided for controlling RAM 110.

A bus 130 interconnects the components of computer system 100. A bus controller 125 is provided for controlling bus 130. An interrupt controller 135 is used for receiving and processing various interrupt signals from the system components.

Mass storage may be provided by diskette 142, CD ROM 147, or hard drive 152. Data and software may be exchanged with computer system 100 via removable media such as diskette 142 and CD ROM 147. Diskette 142 is insertable into diskette drive 141 which is, in turn, connected to bus 30 by a controller 140. Similarly, CD ROM 147 is insertable into CD ROM drive 146 which is, in turn, connected to bus 130 by controller 145. Hard disk 152 is part of a fixed disk drive 151 which is connected to bus 130 by controller 150.

User input to computer system 100 may be provided by a number of devices. For example, a keyboard 156 and mouse 157 are connected to bus 130 by controller 155. An audio transducer 196, which may act as both a microphone and a speaker, is connected to bus 130 by audio controller 197, as illustrated. It will be obvious to those reasonably skilled in the art that other input devices, such as a pen and/or tabloid may be connected to bus 130 and an appropriate controller and software, as required. DMA controller 160 is provided for performing direct memory access to RAM 110. A visual display is generated by video controller 165 which controls video display 170. Computer system 100 also includes a communications adaptor 190 which allows the system to be interconnected to a local area network (LAN) or a wide area network (WAN), schematically illustrated by bus 191 and network 195.

Operation of computer system 100 is generally controlled and coordinated by operating system software, such as the OS/2® operating system, available from International Business Machines Corporation, Boca Raton, Fla. The operating system controls allocation of system resources and performs tasks such as processing scheduling, memory management, networking, and I/O services, among things. In particular, an operating system 20 resident in system memory and running on CPU 105 coordinates the operation of the other elements of computer system 100. The present invention may be implemented with any number of commercially available operating systems including OS/2, UNIX and DOS, etc. One or more applications 202 such as Lotus NOTES™, commercially available from Lotus Development Corp., Cambridge, Mass. If operating system 200 is a true multi-tasking operating system, such as OS/2, multiple applications may execute simultaneously.

Figure 2:
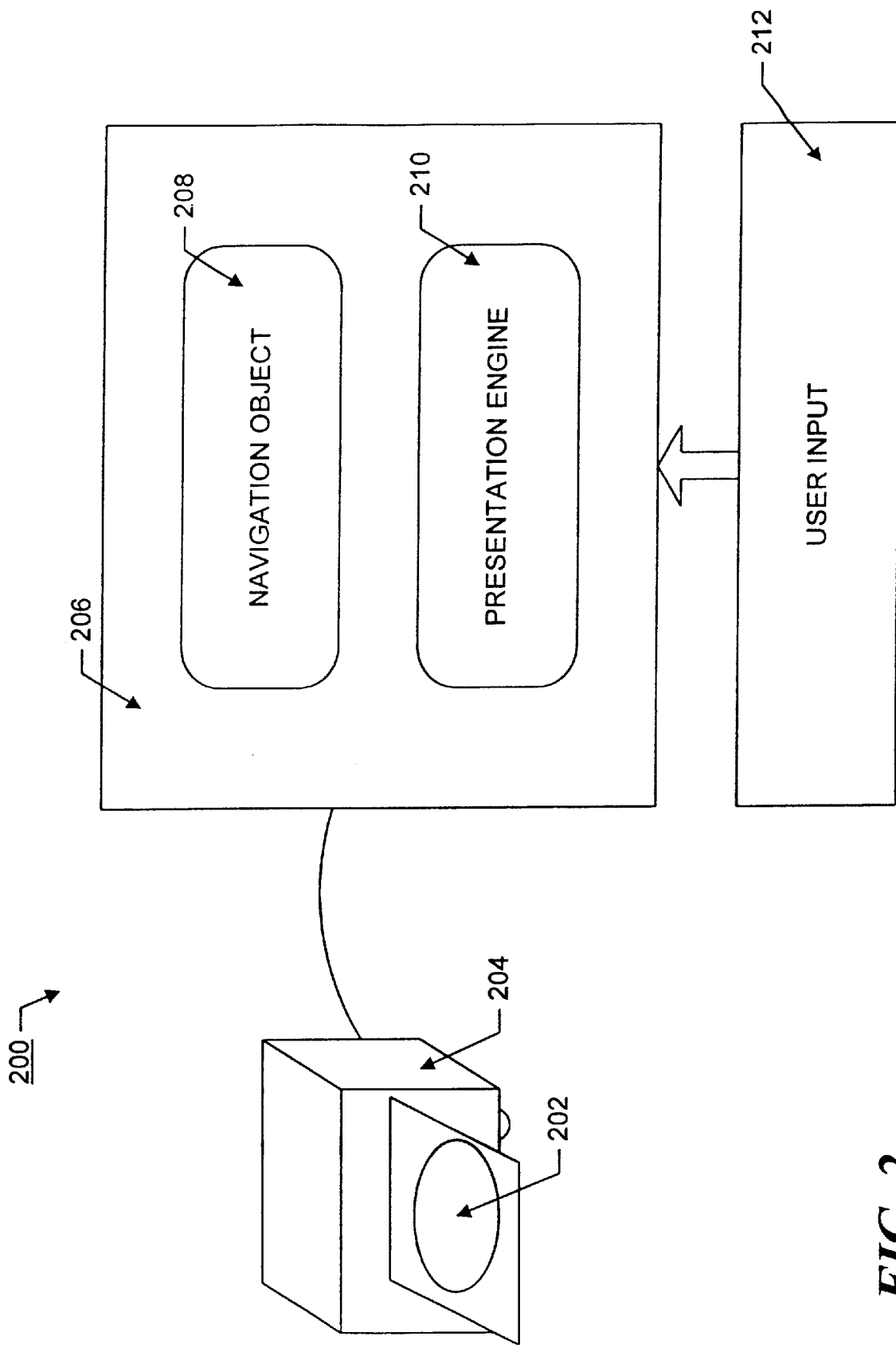
FIG. 2 is a conceptual diagram of the elements comprising a DVD system including a DVD drive and an accompanying computer with software components installed therein.

FIG. 2 illustrates conceptually the main components of a system 200 in accordance with the present invention. FIG. 2 shows a DVD-ROM drive 204 connected to a computer 206. Use of the DVD-ROM drive 204 with the computer 206 should not be construed as a limitation of the invention, however, since other DVD systems, such as a DVD-VIDEO systems, may be used with many other types of multimedia devices, including television systems. In addition, the DVD-ROM drive 204 may also be a drive suitable for internal mounting in computer 206.

The DVD drive 204 receives a disc 202 containing compressed and encoded information which has been coded in accordance with the DVD 1.0 Specification for read-only disk and disk 202 preferably contains up to seventeen gigabytes of information. The computer 206 includes a driver (not shown) for enabling the operating system in the computer 206 to control and exchange information with the drive 204. It also includes one or more input devices 212 which receive input from a user.

The computer 206 also includes a control and playback program shown schematically in FIG. 2 as having a navigation object 208 with logic for reading data from the drive. A presentation engine 210 includes decompressing and decoding routines for decoding the information on the disc 202 and routines for formatting the information for display. For example, the audio information may be compressed by means of conventional compression technique known as Dolby® AC-3® compression (also known as "Dolby® Digital" decompression), and video information may be compressed using a compression technique known as MPEG-2 (Moving Picture Experts Group-2).

In a preferred embodiment, the software elements of system 200 are implemented using object-oriented programming techniques. As will be understood by those skilled in the art, Object-Oriented Programming (OOP) techniques involve the definition, creation, use and destruction of "objects". These objects are software entities comprising data elements, or attributes, and methods, or functions, which manipulate the data elements. The attributes and related methods are treated by the software as an entity and can be created, used and deleted as if they were a single item. Together, the attributes and methods enable objects to model virtually any real-world entity in terms of its characteristics, which can be represented by the data elements, and its behavior, which can be represented by its data manipulation functions. In this way, objects can model concrete things like people and computers, and they can also model abstract concepts like numbers or geometrical designs.

Objects are defined by creating "classes" which are not objects themselves, but which act as templates that instruct the compiler how to construct the actual object. A class may, for example, specify the number and type of data variables and the steps involved in the methods which manipulate the data. When an object-oriented program is compiled, the class code is compiled into the program, but no objects exist. Therefore, none of the variables or data structures in the compiled program exist or have any memory allotted to them. An object is actually created by the program at runtime by means of a special function called a constructor which uses the corresponding class definition and additional information, such as arguments provided during object creation, to construct the object. Likewise objects are destroyed by a special function called a destructor. Objects may be used by using their data and invoking their functions. When an object is created at runtime memory is allotted and data structures are created.

The principle benefits of object-oriented programming techniques arise out of three basic principles; encapsulation, polymorphism and inheritance. More specifically, objects can be designed to hide, or encapsulate, all, or a portion of, the internal data structure and the internal functions. More particularly, during program design, a program developer can define objects in which all or some of the attributes and all or some of the related functions are considered "private" or for use only by the object itself. Other data or functions can be declared "public" or available for use by other programs. Access to the private variables by other programs can be controlled by defining public functions for an object which access the object's private data. The public functions form a controlled and consistent interface between the private data and the "outside" world. Any attempt to write program code which directly accesses the private variables causes the compiler to generate an error during program compilation which error stops the compilation process and prevents the program from being run.

Polymorphism is a concept which allows objects and functions which have the same overall format, but which work with different data, to function differently in order to produce consistent results. For example, an addition function may be defined as variable A plus variable B (A+B) and this same format can be used whether the A and B are numbers, characters or dollars and cents. However, the actual program code which performs the addition may differ widely depending on the type of variables that comprise A and B. Polymorphism allows three separate function definitions to be written, one for each type of variable (numbers, characters and dollars). After the functions have been defined, a program can later refer to the addition function by its common format (A+B) and, at runtime, the program will determine which of the three functions is actually called by examining the variable types. Polymorphism allows similar functions which produce analogous results to be "grouped" in the program source code to produce a more logical and clear program flow.

The third principle which underlies object-oriented programming is inheritance, which allows program developers to easily reuse pre-existing programs and to avoid creating software from scratch. The principle of inheritance allows a software developer to declare classes (and the objects which are later created from them) as related. Specifically, classes may be designated as subclasses of other base classes. A subclass "inherits" and has access to all of the public functions of its base classes just as if these function appeared in the subclass. Alternatively, a subclass can override some or all of its inherited functions or may modify some or all of its inherited functions merely by defining a new function with the same form (overriding or modification does not alter the function in the base class, but merely modifies the use of the function in the subclass). The creation of a new subclass which has some of the functionality (with selective modification) of another class allows software developers to easily customize existing code to meet their particular needs.

In accordance with the principles of the present invention, the navigation system is multi-threaded, that is, it uses several independently running threads to perform the operations required by the system. In particular, during DVD playback, three threads are always created. The first thread is a user interface thread which accepts and processes user requests or commands, such as a command to seek within a title or a command to jump to a different title.

The second thread which is always created is a navigation thread which processes navigation commands, such as commands found in the DVD data content to update the values of variables and parameters. The third thread which is always created is the stream parser thread. This thread is responsible for reading encoded data from a data source, for example, the DVD-ROM drive, the INTERNET, or another source, and routing the encoded data to decoding apparatus. The stream parser thread also performs audio-visual synchronization.

In addition, depending on the DVD content, a highlight thread may also be created. This thread is responsible for processing the selection of buttons graphically displayed on a display screen. The buttons may be selected by either user input or by commands in the navigation user screen.

Figure 3:
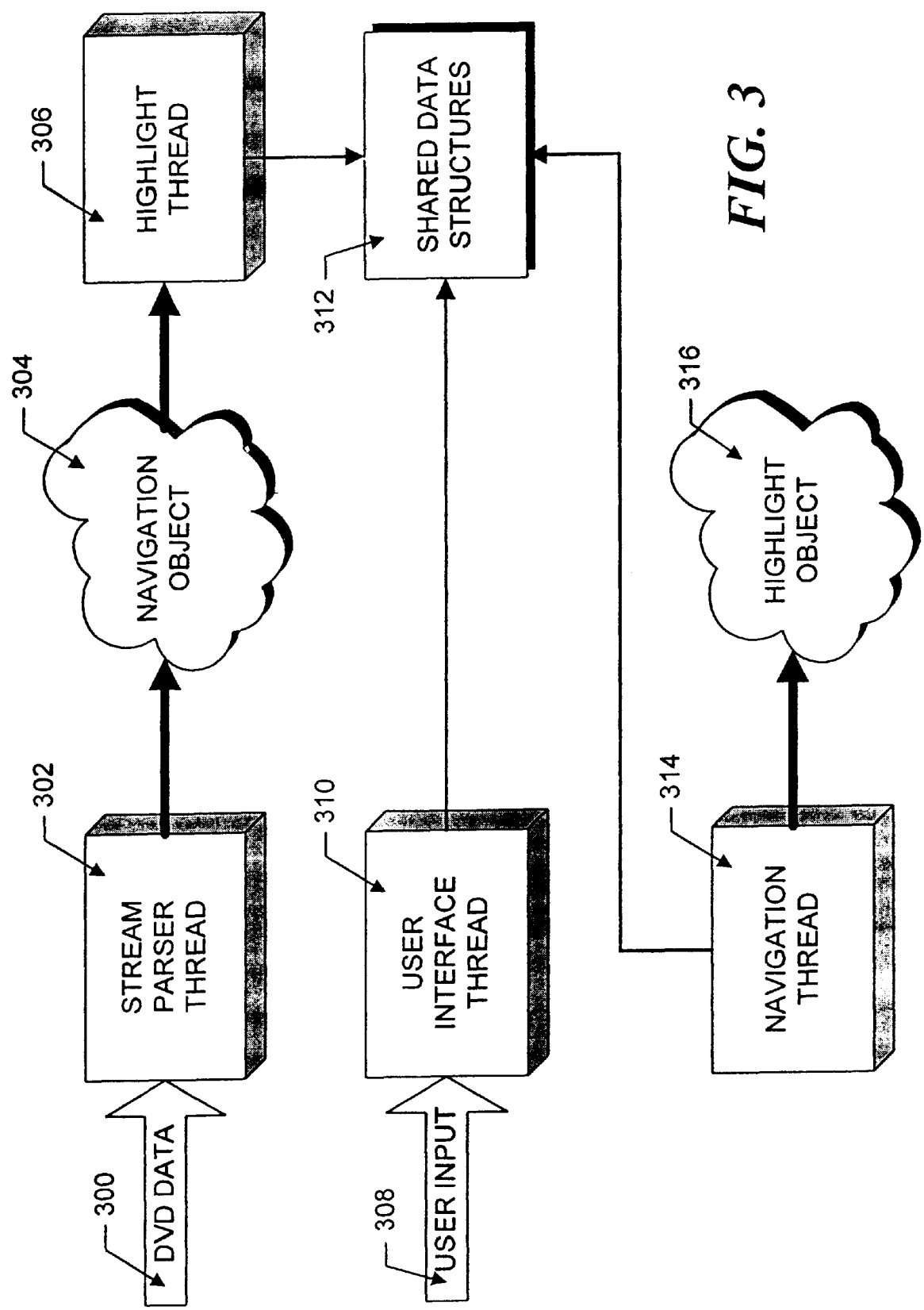
FIG. 3 is a conceptual diagram of the multiple threads and objects which comprise a DVD navigation system constructed in accordance with the principles of the present invention.

The aforementioned four threads are illustrated schematically in FIG. 3. In particular, the stream parser thread 302 is created when the DVD player commences operation. It receives DVD data from a data source such as a DVD-ROM drive, which data is indicated schematically by user stream 300. During operation, the stream parser 302 creates a navigation object 304. The navigation object includes methods which execute the navigation commands. If there is highlight information present in the DVD data stream, the navigation object 304 creates a highlight thread 306 as discussed below.

A user interface thread 310 is also created when the DVD player commences operation. It receives user input 308 from an input device, such as a keyboard or mouse, as previously discussed.

Finally, a navigation thread 314 is also created by the navigation object when the DVD player begins operation. If highlight information is present in the DVD data stream then a highlight object 316 is created by the navigation thread 314. The highlight object encapsulates the highlight information and is used by the highlight thread to process the highlight information. The highlight thread 306, the user interface thread 310 and the navigation thread 314 share several data structures indicated schematically by box 312 so that these threads can pass information between themselves.

Figure 4:
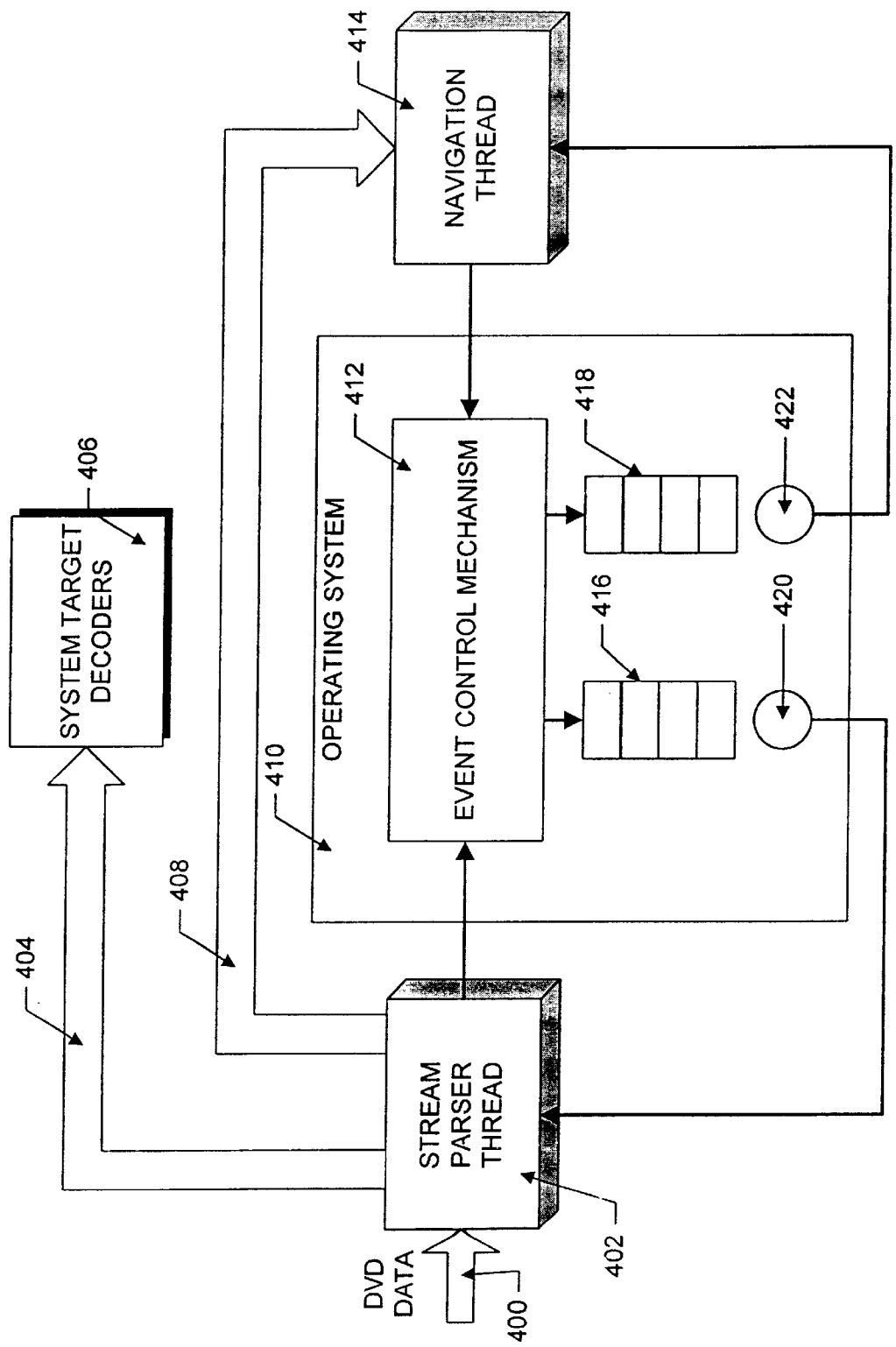
FIG. 4 is a conceptual block diagram illustrating the synchronization of the stream parser and navigation threads via an event control mechanism.
Figure 5A:
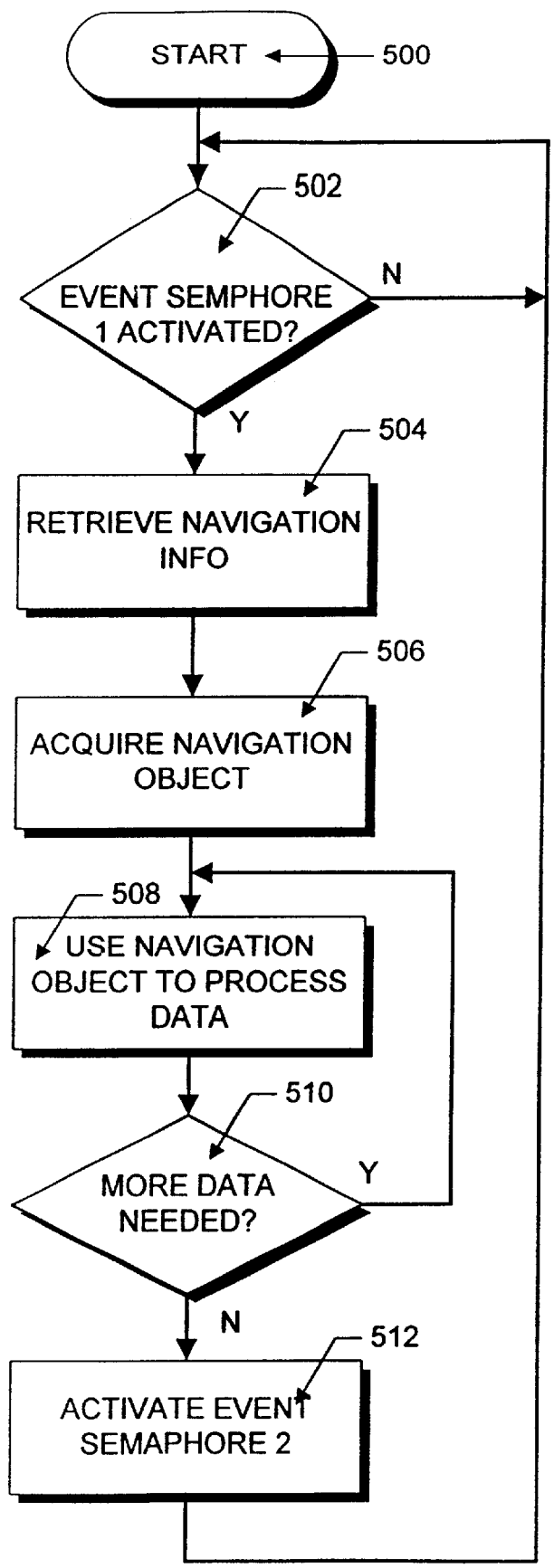
FIG. 5A is a flowchart illustrating a method for synchronizing a stream parser thread and a navigation thread via an event control mechanism and particularly illustrating the operation of the navigation thread.
Figure 5B:
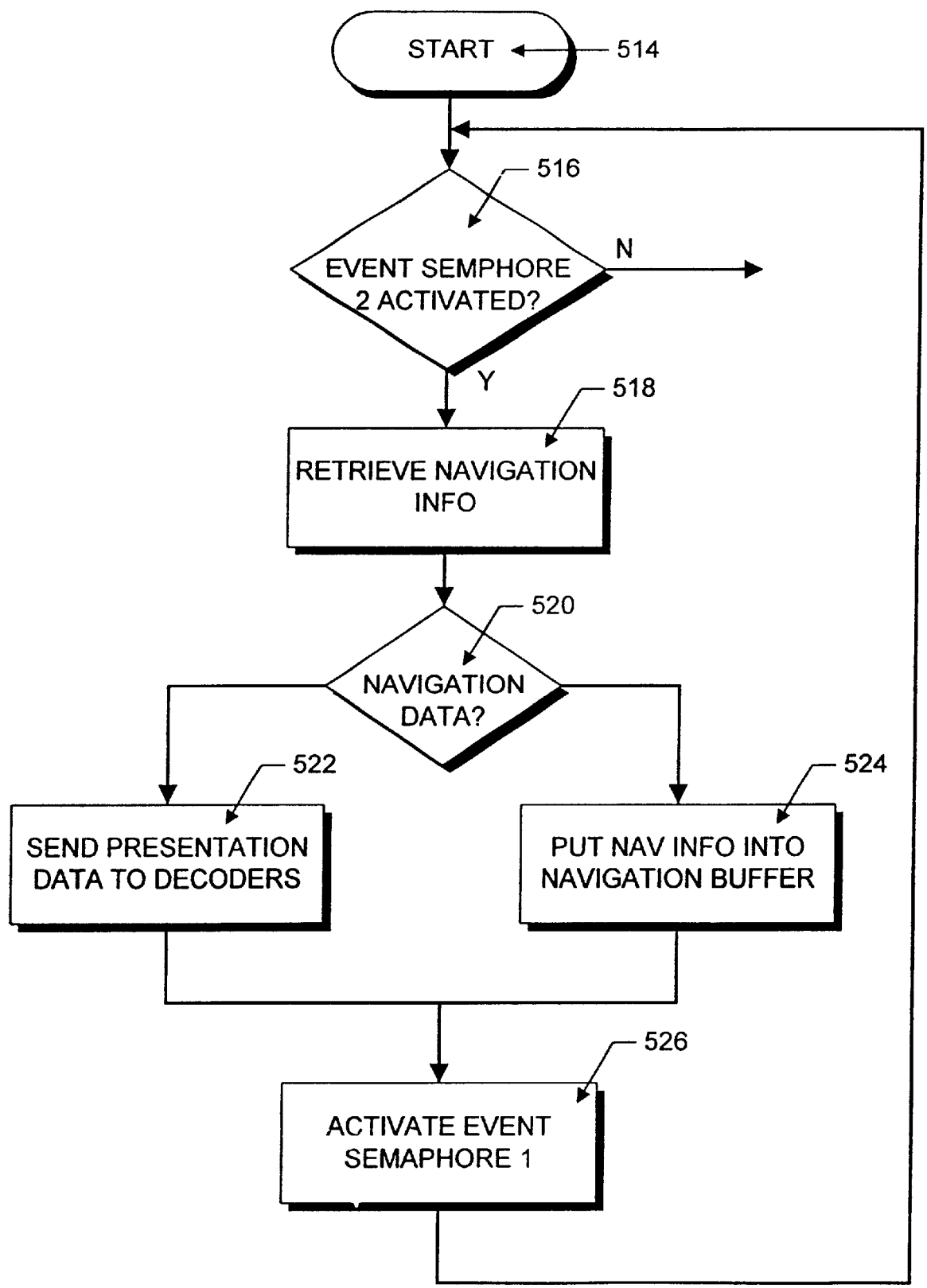
FIG. 5B is a flowchart illustrating a method for synchronizing a stream parser thread and a navigation thread via an event control mechanism and particularly illustrating the operation of the stream parser thread.

Once the threads have been created, various techniques described below are used to synchronize the thread actions and maximize parallel operation. In particular, FIG. 4 and FIGS. 5A and 5B show an illustrative method for synchronizing the navigation and stream parser threads. In FIG. 4, elements that correspond to those in FIG. 3 have been given corresponding numerals. For example, stream parser thread 302 in FIG. 3 corresponds to stream parser thread in FIG. 4. In FIG. 4, the stream parser thread has been given the corresponding numeral of 402.

As shown in FIG. 4, the stream parser thread 402 and the navigation thread 414 interact by means of an event control mechanism 412. Such event control systems are typically included as part of a conventional operating system 410. The event control mechanism 412 maintains two semaphores, 420 and 422, which are used to signal the stream parser thread 402 and the navigation thread 414, respectively. Each of the semaphores 420 and 422 is accompanied by a queue mechanism, 416 and 418. Semaphore events can be added to the appropriate queue by means of the event control mechanism 412. When an event is added to a queue, the corresponding semaphore "wakes up", or unblocks, the associated thread.

The stream parser thread 402 can receive DVD data as indicated schematically by arrow 400. The DVD data includes content data, formatting data and navigation data. DVD content data is transferred to system target decoders 406 as illustrated schematically by arrow 404. System target decoders 406 decompress and decode the information in a conventional manner. Navigation information, however, is transferred from stream parser thread 402 to navigation thread 414 as indicated schematically by arrow 408.

The operational sequence of the navigation thread 414 and the stream parser thread 402 are shown in FIGS. 5A and 5B, respectively. In particular, FIG. 5A illustrates the steps performed by the navigation routine in processing data which has been retrieved from the DVD data source by the stream parser thread 402. The routine starts in step 500 and proceeds to step 502 where the navigation thread monitors its associated event semaphore to see whether the semaphore has been activated. If not, the routine returns to step 502. If the event semaphore 1 has been activated, the routine proceeds to step 504 in which the navigation information is retrieved from a navigation thread buffer where the information has been previously placed by the stream parser thread as illustrated in FIG. 5B.

Returning to FIG. 5A, in step 506, the navigation thread acquires the navigation object (object 304, FIG. 3.) Since the user interface thread may also need to acquire the navigation object in order to process navigation commands concurrently with the navigation thread, the navigation object is designed to be re-entrant.

In step 508, the navigation object is used to process the navigation data. When the navigation engine needs data it can require the stream parser to get the navigation data and presentation data for the system target decoders 406. In step 510, a check is made to determine whether additional data is needed. If not, the routine returns to step 508 and continues processing the data. If additional data is needed, the routine proceeds to step 512 where the common data structures are loaded with the type and location of data to be retrieved and the event semaphore 2 is activated. The navigation thread then returns to step 502 and blocks on event semaphore 1.

The routine followed by the stream parser thread in interacting with the navigation thread is shown in FIG. 5B. This routine starts in step 514 and proceeds to step 516 where the stream parser thread monitors event semaphore 2 to detect whether it has been activated. If the event semaphore 2 has not been activated, the routine returns to step 516 and continues monitoring event semaphore 2.

Alternatively, if in step 516, the event semaphore 2 has been activated, the routine proceeds to step 518 where it reads the DVD data stream to obtain navigation or presentation data. In step 520, a determination is made whether the data is navigation data or presentation data. If the data is navigation data, routine proceeds to step 524 where the navigation data is placed into the navigation thread buffer.

Alternatively, if, in step 520 it is determined that the data is presentation data, the data is sent to the system target decoders in step 522. In either case, in step 526, the event semaphore 1 is activated. The stream parser thread then blocks on event semaphore 2. The activation of event semaphore 1 the routine shown in FIG. 5A causing the navigation thread to retrieve the information placed in the navigation thread buffer. The processes illustrated in FIGS. 5A and 5B continue indefinitely until the user stops playing the title.

Figure 6:
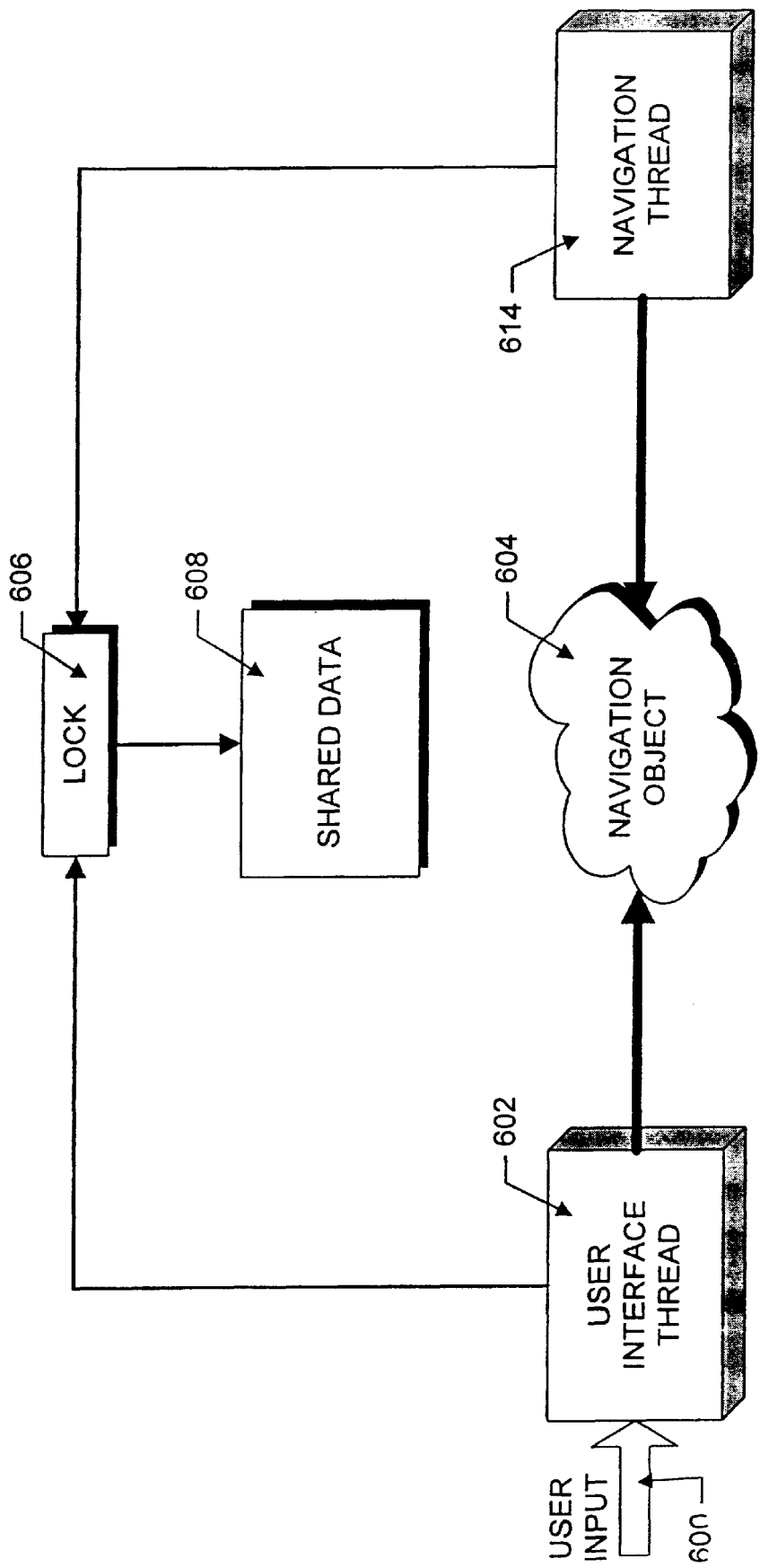
FIG. 6 is a conceptual block diagram illustrating the synchronization of the user interface and navigation threads which use a re-entrant navigation object.
Figure 7A:
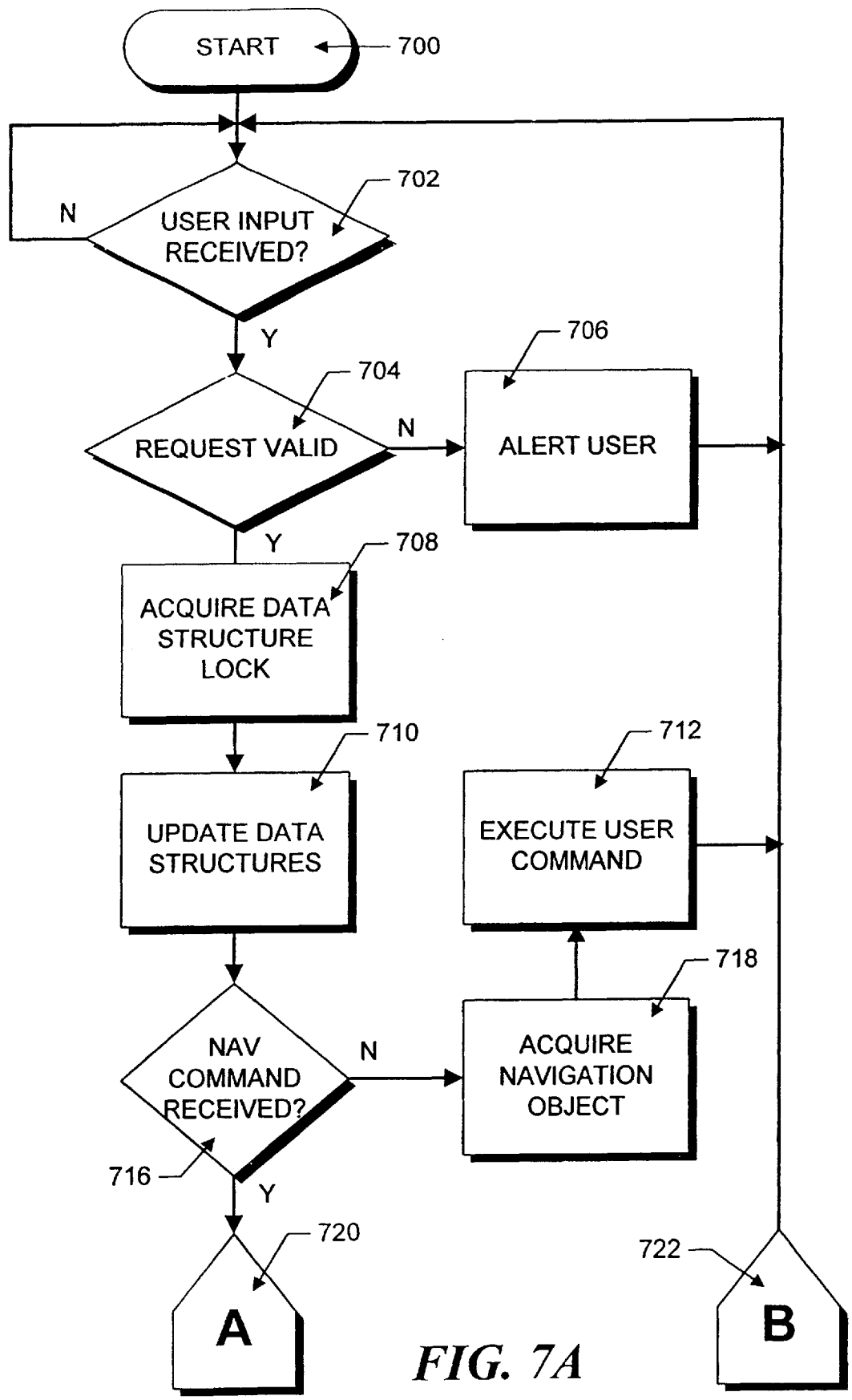
FIGS. 7A and 7B, when placed together, form a flowchart illustrating a method for synchronizing a user interface thread and a navigation thread.
Figure 7B:
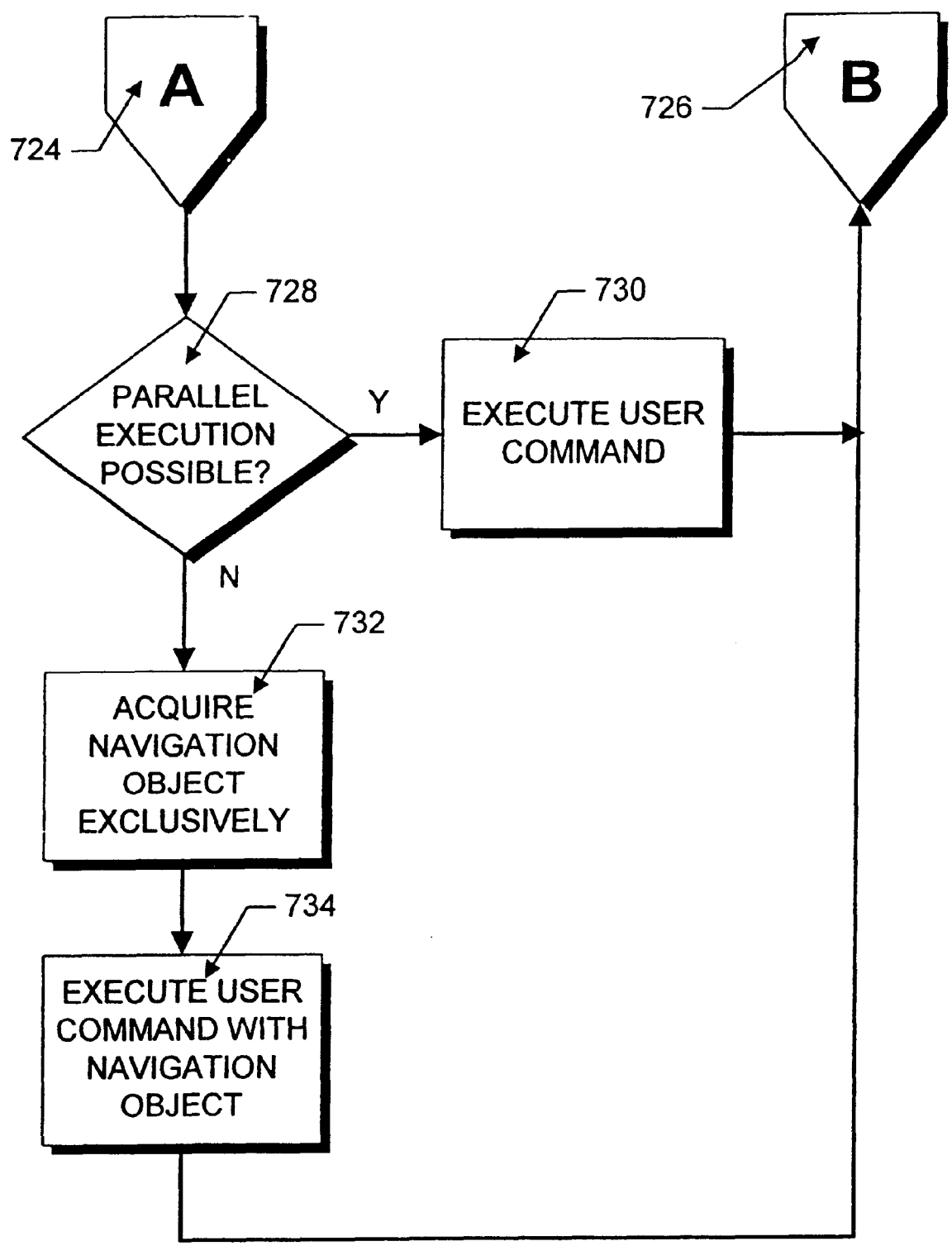

The synchronization of the navigation thread and the user interface thread is illustrated in FIG. 6 and FIGS. 7A and 7B. FIG. 6 illustrates schematically the interaction between the two threads. In particular, the user interface thread 602 and the navigation thread 614 interact by means of navigation object 604 and shared data 608. The user interface thread 602 receives user input from a conventional input device such as a keyboard or mouse, which input data is indicated schematically by arrow 600. As mentioned previously, both the user interface thread 602 and navigation thread 614 share the re-entrant navigation object 604 since each may have to execute a navigation command in parallel with the other. In addition, the user interface thread 602 and the navigation thread 614 share various data structures indicated schematically by box 608. Access to the share data structures is controlled by lock 606 so that one thread can update the shared data structures without interference from the other thread.

The operation of user interface thread 602 is illustrated in FIGS. 7A and 7B. In this routine, which starts in step 700, the user interface thread interacts with the navigation object 604. In particular, in step 702, the routine monitors the user input devices to detect whether user input has been received. If no input has been received, the routine proceeds back to step 702 and continues monitoring the user devices for user requests.

Alternatively, if, in step 702, user input is detected, the routine proceeds to step 704 where a received user request is checked for validity. If the user request is invalid, then, in step 706, the user is alerted and the routine proceeds back to step 702 to continue monitoring for further user requests.

Alternatively, if, in step 704, valid user input is detected, the routine proceeds to step 708 where the lock 606 for the shared data structures 608 is acquired. The data structures are then updated in step 710 and then the routine proceeds to step 716 to determine whether a navigation command has been received. If, in step 716, it is determined that a navigation command has not been received, then the user interface thread acquires the navigation object exclusively in step 718 and, in step 712, the routine executes the user command with the navigation object.

Alternatively, if, in step 716, it is determined that a navigation command has been received then the routine proceeds, via off-page connectors 720 and 724, to step 728. In step 728, a determination is made whether the command can be executed in parallel with another command. In particular, a determination is made whether the on-going processing of a previous command will be affected by processing of the new command. If the command can be executed in parallel with another command as determined in step 728, the routine proceeds to step 730 where the user command is executed in parallel with the processing of the existing command. The routine then proceeds, via off-page connectors 726 and 722, back to step 702 to determine whether additional user input has been received.

Alternatively, if, in step 728, it is determined that the command cannot be executed in parallel with an existing command, then, in step 732, the navigation object is acquired exclusively and used to execute the user command as set forth in step 734. The routine then proceeds, via off-page connectors 726 and 722, back to step 702.

Figure 8:
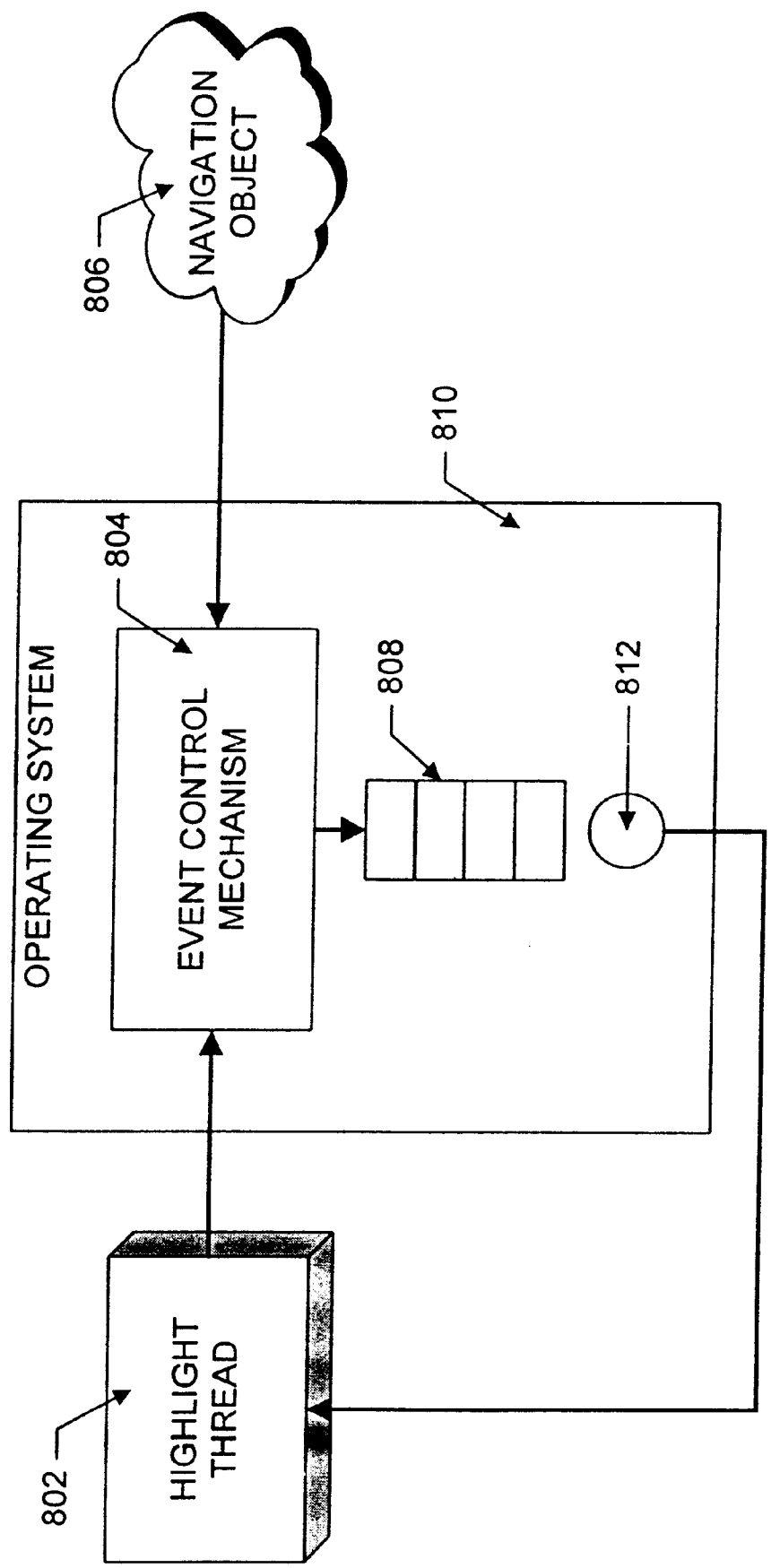
FIG. 8 is a conceptual block diagram illustrating the synchronization of the highlight interface with the operation of the navigation object via an event control mechanism.
Figure 9:
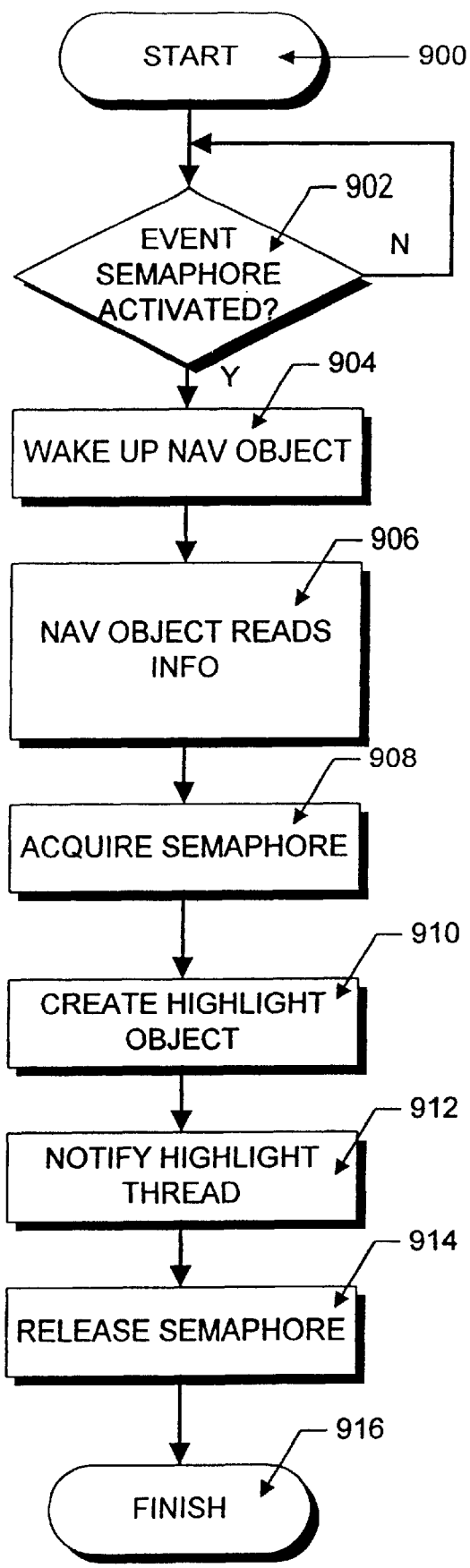
FIG. 9 is a flowchart illustrating the operation of the navigation object in responding to a play command.

The interaction of the highlight thread and the navigation object is illustrated in FIGS. 8 and 9. In particular, the highlight thread 802, shown in FIG. 8, cooperates with the navigation object 806 by means of the event control mechanism 804 found in a conventional operating system 810, as previously described. In particular, the event control mechanism 804 uses semaphore 812 with a queue 808 to communicate with the highlight thread 802. The sequence of operations which occur during this communication is illustrated in the flowchart shown in FIG. 9. The routine shown in FIG. 9 starts in step 900 and proceeds to step 902 where an event semaphore (not shown in FIG. 8) controls the operation of the navigation object. In particular, in step 902, the navigation object monitors the event semaphore to determine whether it has been activated. If not, the navigation object returns to step 902 to continue monitoring. If the event semaphore has been activated, the routine proceeds to step 904 where the navigation object is awakened. In step 906, the active navigation object obtains navigation data and commands, which may include highlight commands, from the DVD data stream, as previously described.

If highlight commands are found in the DVD data stream, then, in step 908, the navigation object acquires a semaphore to insure that it can operate without interference. In step 910, a highlight object is created. In step 912, the highlight thread is notified by means of the semaphore mechanism shown in FIG. 8. More particularly, the navigation object activates the semaphore 812 by placing an activation event in the queue 808. In step 914, the navigation object then releases the semaphore, and the routine finishes in step 916.

Figure 10:
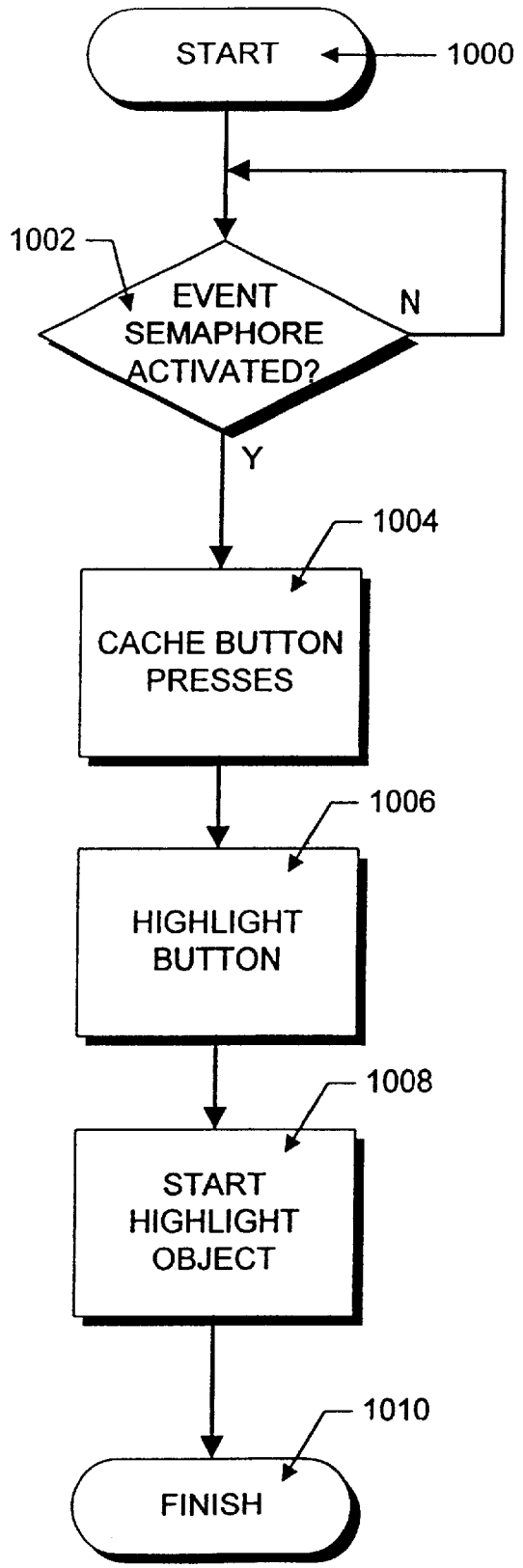
FIG. 10 is a flowchart illustrating the operation of the highlight thread in processing data retrieved from the DVD data stream by the navigation object.

The operation of the highlight thread is illustrated in FIG. 10. The highlight thread routine begins in step 1000 then proceeds to step 1002 where the event semaphore 812 is monitored by the highlight thread 802 to determine whether the semaphore has been activated. If the event semaphore has not been activated, then the routine returns to step 1002 where the highlight thread continues monitoring the semaphore.

Alternatively, if in step 1002, it is determined that the event semaphore has been activated, the routine proceeds to step 1004 where incoming button press commands are cached while the routine is processing the highlight data in the highlight object. The routine then proceeds to step 1006 where the appropriate button is highlighted based on the commands found in the data stream. Next, in step 1008, the highlight object is started. The routine then finishes in step 1010.

Figure 11A:
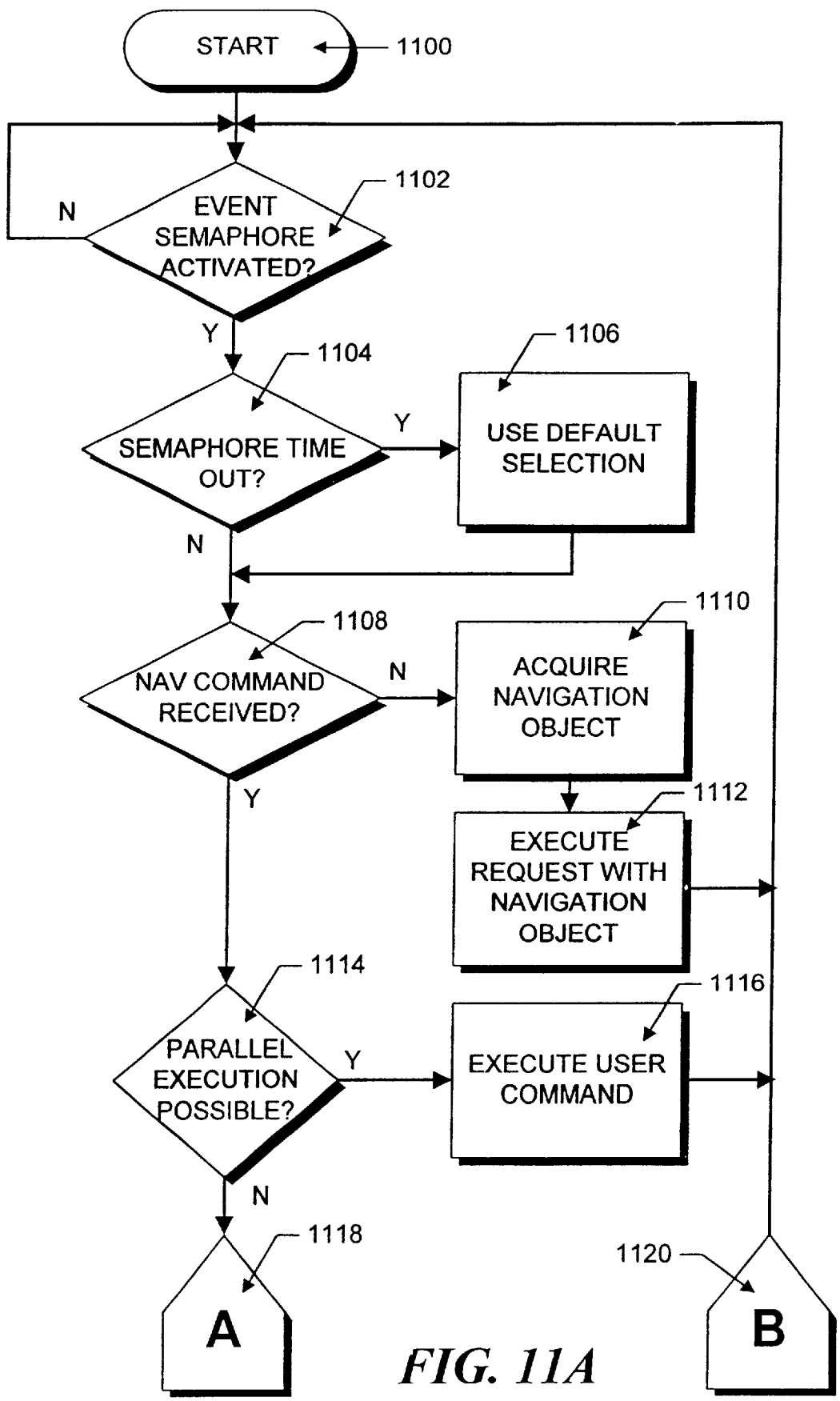
FIGS. 11A and 11B, when placed together, form a flowchart illustrating the operation of the highlight thread as synchronized with the navigation thread.
Figure 11B:
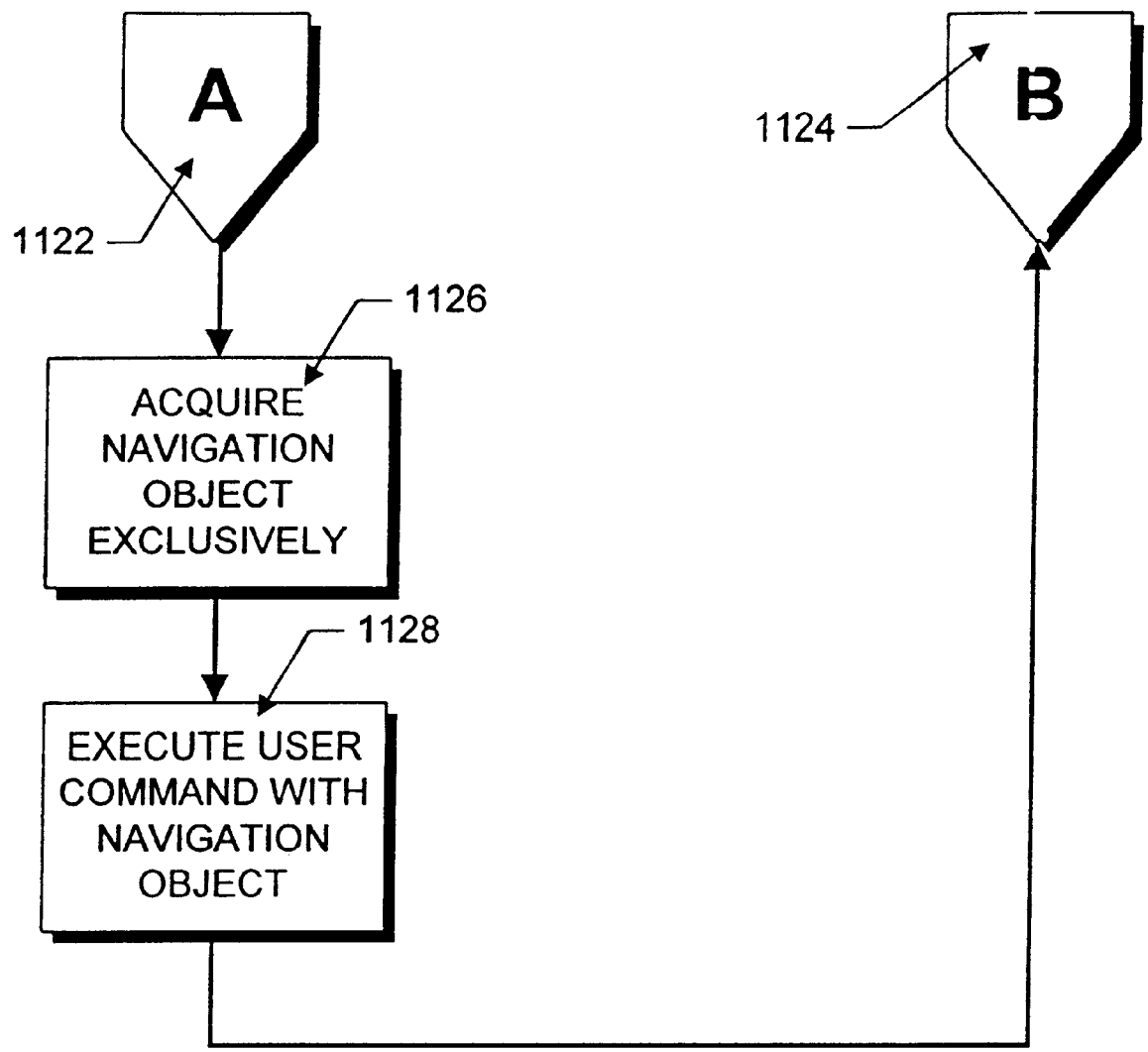

FIGS. 11A and 11B show an illustrative method for synchronizing the navigation and highlight threads. As previously mentioned, the highlight thread is activated whenever highlight data is encountered in the DVD data stream. It uses the routine shown in FIGS. 11A and 11B to communicate with the navigation thread and process commands. The routine starts in step 1100 and proceeds to step 1102 where the highlight thread monitors an event semaphore to detect whether the event semaphore has been activated. If the semaphore has not been activated, the routine returns to step 1102 and continues monitoring the event semaphore.

If the event semaphore has been activated as detected in step 1102, then the routine proceeds to step 1104 where a check is made to determine whether the semaphore has timed out. The time out of the semaphore is an indication that the user did not make a button selection. In this case, the routine proceeds to step 1106. If the user does not make a button selection within a predetermined time interval, default instructions in the DVD data stream are used to determine which button, if any, should be selected. In addition, any commands associated with the default button, are executed using the routine beginning in step 1108.

If, in step 1104, the semaphore is not timed out, or the default button selection was used, then the routine proceeds to step 1108 where a determination is made whether a navigation command has been received. If a navigation command has not been received, then the routine proceeds to step 1110 where the navigation object is acquired exclusively. In step 1112, the routine executes the user's request with the navigation object. The routine then proceeds back to step 1102 to begin monitoring the event semaphore again.

Alternatively, if, in step 1108, it is determined that a navigation command has been received, then the routine proceeds to step 1114 to determine whether the navigation command can be executed in parallel with another command presently being executed. If parallel execution is possible, the routine proceeds to step 1116 to execute the user command in parallel. The routine then returns back to step 1102.

Alternatively, if, in step 1114, it is determined that parallel execution is not possible, the routine proceeds, via off-page connectors 1118 and 1122, to step 1126 where the navigation object is acquired exclusively. In step 1128, the user command is executed with the navigation object. The routine then proceeds, via off-page connectors 1124 and 1120, back to step 1102 to begin monitoring the event semaphore once again.

A software implementation of the above described embodiment(s) may comprise a series of computer instructions either fixed on a tangible medium, such as a computer readable media, e.g. diskette 142, CD-ROM 147, ROM 115, or fixed disk 152 of FIG. 1, or transmittable to a computer system, via a modem or other interface device, such as communications adapter 190 connected to the network 195 over a medium 191. Medium 191 can be either a tangible medium, including but not limited to optical or analog communications lines, or may be implemented with wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disk, or distributed from a server or electronic bulletin board over a network, e.g., the Internet or World Wide Web.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Further, the methods of the invention may be achieved in either all software implementations, using the appropriate processor instructions, or in hybrid implementations which utilize a combination of hardware logic and software logic to achieve the same results. Further, aspects such as the size of memory, number of bits utilized to represent datum or a signal, data word size, the number of clock cycles necessary to execute an instruction, and the specific configuration of logic and/or instructions utilized to achieve a particular function, as well as other modifications to the inventive concept are intended to be covered by the appended claims.

What is claimed is:

1. Multi-threaded navigation apparatus for a digital versatile disc system having a DVD reader for generating a DVD data stream and a user input device for receiving user commands, the navigation apparatus comprising:

a stream parser thread for receiving the DVD data stream and for extracting navigation commands therefrom;

a navigation thread operating separately from the stream parser thread and responsive to the retrieved navigation commands for selecting portions of the DVD data stream for display;

means for synchronizing the operation of the stream parser thread and the navigation thread comprising a first semaphore controlled by the stream parser thread for starting the navigation thread and a second semaphore controlled by the navigation thread for starting the stream parser thread;

a user interface thread operating separately from the stream parser thread and the navigation thread and responsive to user commands from the user input device for manipulating displayed DVD data; and means for synchronizing the operation of the navigation thread and the user interface thread.

2. Navigation apparatus according to claim 1 wherein the stream parser thread, the navigation thread and the user interface thread are all started when the digital versatile disc system is started.

3. Navigation apparatus according to claim 1 further comprising a highlight thread operating separately from the stream parser thread, the navigation thread and the user Input thread and responsive to retrieved navigation commands for selectively modifying a display of DVD data.

4. Navigation apparatus according to claim 1 wherein the means for synchronizing the operation of the stream parser thread and the navigation thread comprises an event control mechanism.

5. Navigation apparatus according to claim 1 wherein the stream parser thread instantiates a navigation object for processing retrieved navigation commands.

6. Navigation apparatus according to claim 5 wherein the navigation object is re-entrant and is concurrently used by the navigation thread and the user interface thread.

7. Navigation apparatus according to claim 5 wherein the navigation object interacts with the highlight thread by means of an event control mechanism.

8. Navigation apparatus according to claim 3 wherein the navigation thread instantiates a highlight object containing highlight command information and wherein the information in the highlight object Is processed by the highlight thread.

9. Navigation apparatus according to claim 5 further comprising a data structure having a lock mechanism and wherein the stream parser thread, the navigation thread and the user interface thread share the data structure by means of the lock mechanism.

10. A method for processing navigation commands in a digital versatile disc system having a DVD reader far generating a DVD data stream and a user input device for receiving user commands, the method comprising:
   (a) creating a stream parser thread for receiving the DVD data stream and for extracting navigation commands therefrom;
   (b) creating a navigation thread operating separately from the stream parser thread and responsive to the retrieved navigation commands for selecting portions of the DVD data stream for display;
   (c) synchronizing the operation of the stream parser thread and the navigation thread by:
      (c1) controlling a first semaphore with the stream parser thread;
      (c2) using the first semaphore to start the navigation thread;
      (c3) controlling a second semaphore with the navigation thread; and
      (c4) using the second semaphore to start the stream parser thread
   (d) creating a user interface thread operating separately from the stream parser thread and the navigation thread and responsive to user commands from the user input device for manipulating displayed DVD data; and
   (e) synchronizing the operation of the navigation thread and the user interface thread.

11. A method according to claim 10 further comprising the step of:
   (f) starting the stream parser thread, the navigation thread and the user interface thread when the digital versatile disc system is started.

12. A method according to claim 10 further comprising the step of:
   (g) creating a highlight thread operating separately from the stream parser thread, the navigation thread and the user input thread and responsive to retrieved navigation commands for selectively modifying a display of DVD data.

13. A method according to claim 10 wherein step (c) comprises the step of:
   (c5) synchronizing the operation of the stream parser thread and the navigation thread with an event control mechanism.

14. A method according to claim 10 further comprising the step of:
   (h) using the stream parser thread to instantiate a navigation object for processing retrieved navigation commands.

15. A method according to claim 14 wherein the navigation object is re-entrant and the method further comprises the step of:
   (i) using the navigation object separately from the navigation thread and the user interface thread.

16. A method according to claim 14 further comprising the step of:
   (j) using an event control mechanism to control an interaction between the navigation object and the highlight thread.

17. A method according to claim 12 further comprising the steps of:
   (k) using the navigation thread to instantiate a highlight object containing highlight command information; and
   (l) processing the information in the highlight object with the highlight thread.

18. A method according to claim 16 further comprising the steps of:
   (n) using the lock mechanism to share the data structure among the stream parser thread, the navigation thread and the user interface thread.

19. A computer program product for processing navigation commands in a digital versatile disc system having a DVD reader for generating a DVD data stream and a user input device for receiving user commands, the computer program product comprising a computer usable medium having computer readable program code thereon, comprising:
   program code for creating a stream parser thread for receiving the DVD data stream and for extracting navigation commands therefrom;
   program code for creating a navigation thread operating separately from the stream parser thread and responsive to the retrieved navigation commands for selecting portions of the DVD data stream for display;
   program code in the stream parser thread for controlling a first semaphore;
   program code for using the first semaphore to start the navigation thread;
   program code in the navigation thread for controlling a second semaphore;
   program code for using the second semaphore to start the stream parser thread;
   program code for creating a user interface thread operating separately from the stream parser thread and the navigation thread and responsive to user commands from the user input device for manipulating displayed DVD data; and
   program code for synchronizing the operation of the navigation thread and the user interface thread.

20. A computer program product according to claim 19 further comprising program code for starting the stream parser thread, the navigation thread and the user interface thread when the digital versatile disc system is started.

21. A computer program product according to claim 19 further comprising program code for creating a highlight thread operating separately from the stream parser thread, the navigation thread and the user input thread and responsive to retrieved navigation commands for selectively modifying a display of DVD data.

22. A computer program product according to claim 19 wherein the program code for synchronizing the operation of the stream parser thread and the navigation thread step comprises program code for controlling an event control mechanism.

23. A computer program product according to claim 19 further comprising program code for using the stream parser thread to instantiate a navigation object for processing retrieved navigation commands.

24. A computer program product according to claim 23 wherein the navigation object is re-entrant and the computer program product further comprises program code for using the navigation object separately from the navigation thread and the user interface thread.

25. A computer program product according to claim 23 further comprising program code for using an event control mechanism to control an Interaction between the navigation object and the highlight thread.

26. A computer program product according to claim 21 further comprising:

program code for using the navigation thread to instantiate a highlight object containing highlight command information; and program code for processing the information in the highlight object with the highlight thread.

27. A computer program product according to claim 23 further comprising:

program code for creating a data structure having a lock mechanism; and program code for using the lock mechanism to share the data structure among the stream parser thread, the navigation thread and the user interface thread.

28. A digital versatile disc system comprising:

a DVD reader for generating a DVD data stream;

a user input device for receiving user commands;

a stream parser thread for receiving the DVD data stream and for extracting navigation commands therefrom;

a navigation thread operating separately from the stream parser thread and responsive to the retrieved navigation commands for selecting portions of the DVD data stream for display;

means for synchronizing the operation of the stream parser thread and the navigation thread comprising a first semaphore controlled by the stream parser thread for starting the navigation thread and a second semaphore controlled by the navigation thread for starting the stream parser thread;

a user interface thread operating separately from the stream parser thread and the navigation thread and responsive to user commands from the user input device for manipulating displayed DVD data; and means for synchronizing the operation of the navigation thread and the user interface.

* * * * *